G. R. Skillman,

Cracker Machine.

No. 113,356.    Patented Apr. 4, 1871.

Witnesses:
Fred Hayne
W. J. Tusk

George R. Skillman
per Mom Lombest & Co
Attorneys

UNITED STATES PATENT OFFICE.

GEORGE R. SKILLMAN, OF BALTIMORE, MARYLAND, ASSIGNOR TO HIMSELF AND JAMES BEATTY, OF SAME PLACE.

IMPROVEMENT IN CRACKER-MACHINES.

Specification forming part of Letters Patent No. 113,356, dated April 4, 1871.

*To all whom it may concern:*

Be it known that I, GEORGE R. SKILLMAN, of the city and county of Baltimore, in the State of Maryland, have invented a new and useful Improvement in Cracker-Machines, of which the following is a full, clear, and exact description, reference being had to the accompanying drawing, forming part of this specification, in which—

Figure 1:
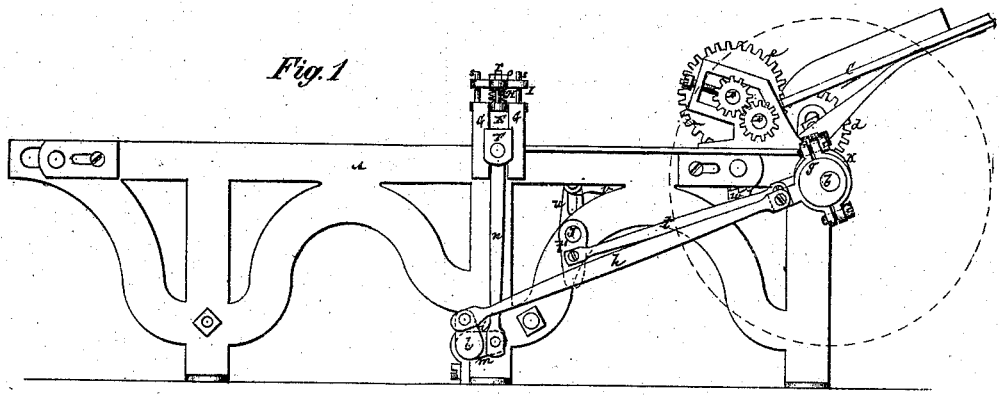
Figure 2:
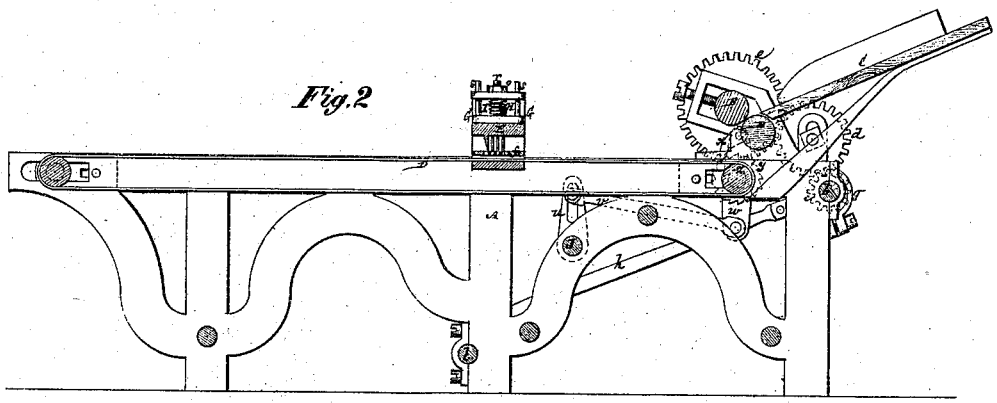
Figure 3:
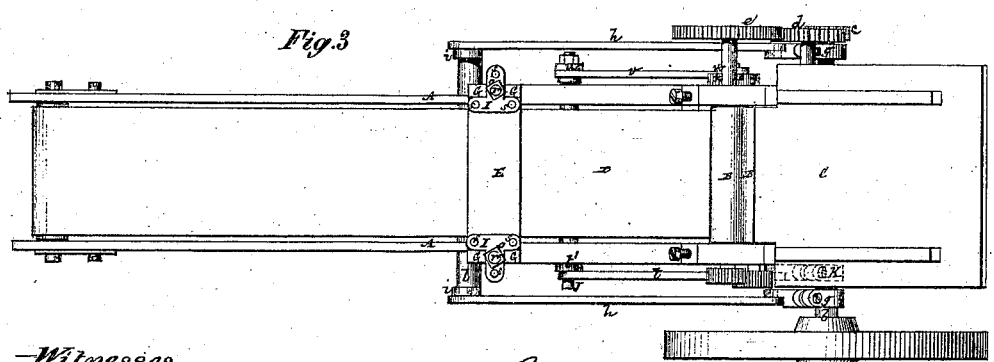

Figure 1 represents a side elevation of a machine constructed in accordance with my improvement; Fig. 2, a longitudinal vertical section of the same, and Fig. 3 a plan thereof.

Similar letters of reference indicate corresponding parts throughout the several figures.

My invention relates to machines for rolling and cutting or cutting and marking dough, as in the manufacture of crackers from dough prepared in sheets and passed through rollers onto an endless apron, arranged to travel, with an intermittent progressive motion, under a cutting-frame, which, coming down during the intervals the apron is at rest, cuts out or stamps the dough, forming crackers or cakes of the shape and peculiarity required; after which, and as the cutting-frame rises, the endless apron moves forward again, carrying the cut or stamped dough from under the cutter, and introducing new dough thereunder for a repetition of the action, as before.

My improvement on such machines consists in a novel and advantageous combination and arrangement of mechanism for operating the cutters or cutting-frame by means of eccentrics from the rear of the machine and on both sides of it; also, in an eccentric driving motion of the endless apron; likewise, in a certain support of the cutting-frame on boxes working in slides or guides, and virtually forming one box; and, furthermore, in a novel arrangement of the springs, by which the cutters are adjusted to operate with any required elastic pressure on the dough, the whole producing a most perfect result generally, including a steady action of the cutters.

Referring to the accompanying drawing, A represents the frame which carries the working parts, and B B the rollers at the foot of the hopper or incline C at back of the machine, and to or through which the dough, properly prepared in sheets, is fed. D is the endless apron, onto which the dough, as it comes from the rollers, passes. This apron may be arranged to have any desired sweep, and by suitably changing the spur-gear by which motion is communicated to the rollers B B, any desired velocity may be given to the latter.

The main or driving shaft $b$, that may be operated by hand, steam, or other suitable power, is arranged across the rear of the machine, and sets in motion the geared rollers B B by means of spur wheels or pinions $c$, $d$, and $e$.

The cutting-frame E, which is made up of a combination of cutters, stamps, or markers, operating in conjunction with a fixed die-plate or clearer, $f$, is arranged to operate across the machine above the apron, at a suitable distance from the rollers, and has its up-and-down motions communicated to it by means of eccentrics $g$ on the driving-shaft, at opposite sides of the machine, said eccentrics being connected, by means of rods $h$, each with an arm or lever, $i$, attached to a rock-shaft, $l$, arranged under the cutting-frame, and connected with the latter on both sides of the machine by arms $m$ and rods $n$, through the intervention of boxes F, one on each side of the machine. These boxes, to which the rods $n$ are attached, serve to support the cutting-frame E, and, in common with the latter, slide up and down within guides G on opposite sides of the machine. By thus supporting the cutting-frame and directing it at its ends, as well as the boxes which carry it in the guides G, and operating both boxes by an eccentric motion from opposite sides of the machine, an exceedingly steady, exact, and smooth action is obtained for the cutters. Said cutting-frame E is held down on the boxes F with an elastic hold or pressure by springs H, which may be of any desired description and of any suitable material. These springs are arranged between clamps I, the upper heads of which are adjustable, as by nuts $o$, on screw rods or pins $r$, projecting upward from the boxes F, and are guided, to effect their adjustment, by guide-pins $s$; also, the lower faces of the clamps preferably guided at their ends by arranging them to slide, in common with the cutting-frame, up and down within the stationary guides G.

This arrangement of the springs on opposite sides effects a steady but elastic action of the cutters, and, by suitably turning the nut $o$, admits of any desired pressure being obtained on the dough.

The endless apron D has its necessary intermittent progressive motion given it by or from a cross rock-shaft, J, which is operated by an eccentric, K, on the driving-shaft $b$, through a rod, $t$, and arm $t'$, said rock-shaft being further provided with another arm, $u$, at its opposite end, to give motion, by means of a rod, $v$, to a lever, $w$, that carries a pawl, $x$, which operates a ratchet, $y$, on the axle of the one roller $z$ of the apron, to effect the travel of the latter, as required, and which, by means of a slotted or adjustable connection of the parts, may have its intermittent travel varied, as desired.

What is here claimed, and desired to be secured by Letters Patent, is—

1. The combination and arrangement of the cutting-frame E, the rock-shaft $l$, with its connections, and the eccentrics $g$ on the rear driving-shaft $b$, and at both or opposite sides of the machine, substantially as specified.

2. The combination of the sliding boxes F, the cutting-frames E, the guides G, and the eccentrics $g$, with their connections, essentially as shown and described.

3. The arrangement of the springs H and adjusting-clamps I with the cutting-frame E, the sliding boxes F, and guides G, substantially as specified.

4. The combination and arrangement, with the apron D, of the rock-shaft J and eccentric K, with its connections, the pawl-lever $w$, and the ratchet $x$, essentially as shown and described.

GEO. R. SKILLMAN.

Witnesses:
H. L. P. WOOLF,
JAMES H. McFEE.